(12) United States Patent
Arai

(10) Patent No.: US 7,330,214 B2
(45) Date of Patent: Feb. 12, 2008

(54) DIAPHRAGM APPARATUS OF LENS FOR CCTV CAMERA

(75) Inventor: Masayuki Arai, Tokyo (JP)

(73) Assignee: PENTAX Corporation, Tokyo (JP)

( * ) Notice: Subject to any disclaimer, the term of this patent is extended or adjusted under 35 U.S.C. 154(b) by 533 days.

(21) Appl. No.: 09/907,638

(22) Filed: Jul. 19, 2001

(65) Prior Publication Data

US 2002/0003583 A1    Jan. 10, 2002

(30) Foreign Application Priority Data

Aug. 7, 2000    (JP) ............................. 2000-238243

(51) Int. Cl.
*G03B 7/00*    (2006.01)
*H04N 5/235*    (2006.01)

(52) U.S. Cl. ...................... 348/362; 396/170

(58) Field of Classification Search ................ 348/335, 348/336, 340, 362, 363, 369, 360, 368, 333, 348/374, 367; 359/885, 888, 889, 350, 585, 359/589; 356/350, 585, 589; 396/355, 357, 396/449, 452, 169, 235, 246, 170, 257, 458, 396/460, 461, 505, 507, 509

See application file for complete search history.

(56) References Cited

U.S. PATENT DOCUMENTS

| | | | | |
|---|---|---|---|---|
| 3,988,066 A | * | 10/1976 | Suzuki et al. ................. | 355/78 |
| 4,316,659 A | * | 2/1982 | Daniels ...................... | 396/179 |
| 4,512,642 A | * | 4/1985 | Ito et al. ...................... | 396/548 |
| 4,740,079 A | * | 4/1988 | Koizumi et al. .......... | 356/237.4 |
| 4,870,496 A | * | 9/1989 | Fantone ...................... | 348/342 |
| 4,880,969 A | * | 11/1989 | Lawrie ....................... | 250/221 |
| 5,293,542 A | | 3/1994 | Ise et al. | |
| 5,325,142 A | * | 6/1994 | Depatie et al. ............. | 396/449 |
| 5,715,103 A | * | 2/1998 | Amano et al. ............. | 359/888 |
| 5,726,797 A | * | 3/1998 | Zhang et al. ............... | 359/350 |
| 5,806,834 A | * | 9/1998 | Yoshida ...................... | 252/589 |
| 5,867,216 A | * | 2/1999 | Yamada et al. ............. | 348/347 |
| 6,078,442 A | * | 6/2000 | Tada et al. .................. | 359/890 |
| 6,251,578 B1 | * | 6/2001 | Buitano et al. ............. | 430/572 |
| 6,424,392 B1 | * | 7/2002 | Bawolek et al. ........... | 349/106 |

(Continued)

FOREIGN PATENT DOCUMENTS

EP    0595205    5/1994

(Continued)

OTHER PUBLICATIONS

Neutral Density Filter ND-70 Data Sheet, Hoya Corporation.*

(Continued)

*Primary Examiner*—Lin Ye
*Assistant Examiner*—Nelson D. Hernández
(74) *Attorney, Agent, or Firm*—Greenblum & Bernstein, P.L.C.

(57) ABSTRACT

A diaphragm apparatus of a lens for a CCTV camera includes a diaphragm blade which opens and closes a stop aperture of the diaphragm apparatus; and an ND filter which is attached to the diaphragm blade, the ND filter having a spectral transmittance so that the transmittance of infrared radiation therethrough is substantially identical to, or less than, the transmittance of visible light therethrough, or alternatively, the ND filter having a spectral transmittance which cuts out infrared radiation. The ND filter covers the stop aperture when the diaphragm blade is moved to open the aperture.

9 Claims, 3 Drawing Sheets

U.S. PATENT DOCUMENTS

| | | | |
|---|---|---|---|
| 6,676,655 B2 * | 1/2004 | McDaniel | 606/9 |
| 6,753,948 B2 * | 6/2004 | Taniguchi | 355/71 |
| 6,771,315 B1 * | 8/2004 | Nanjo et al. | 348/362 |
| 6,817,788 B1 * | 11/2004 | Negishi et al. | 396/505 |
| 2002/0044212 A1 * | 4/2002 | Hashimoto | 348/335 |

FOREIGN PATENT DOCUMENTS

| | | | |
|---|---|---|---|
| JP | 62121405 A | * | 6/1987 |
| JP | 05110938 A | * | 4/1993 |
| JP | 2002189238 A | * | 7/2002 |

OTHER PUBLICATIONS

Hoya ND-70 Filter, Newport Industrial Glass, Inc., May 23, 1999, http://www.newportglass.com/hoynd70.htm.*

Enlgish Language Abstract of EP 0 595 205. May 4, 1994.

* cited by examiner

DIAPHRAGM APPARATUS OF LENS FOR CCTV CAMERA

BACKGROUND OF THE INVENTION

1. Field of the Invention

The present invention relates to a diaphragm apparatus of a lens for a CCTV camera.

2. Description of the Related Art

In a conventional diaphragm apparatus of a lens for a CCTV camera in which a stop of a lens is adjusted by a galvanometer (servo meter) driven diaphragm, an ND (Neutral Density) filter is attached to a diaphragm blade to extend the controllable range of the quantity of light. Since the drive torque of the galvanometer is relatively small, a light and resin ND filter is used.

Conventionally, a film filter for photographic use is utilized as a resin ND (Neutral Density) filter whose spectral transmittance characteristics are such that the transmittance is constant (flat) in the visible light region. The spectral transmittance characteristics of a known ND filter are shown in FIG. 3, by way of example.

However, a conventional ND filter permits infrared radiation to pass therethrough. Therefore, in a monochrome CCTV camera, the F-number is insufficient to restrict the quantity of light, and the spectral distribution is such that the transmittance of infrared radiation is greater than that of the visible light, so that the object portion which exhibits high reflectivity to infrared radiation is made intensive (bright). Consequently, the picture looks like infrared photography and is very hard to see.

Moreover, in recent years, even in color CCTV cameras, an infrared filter which does not permit infrared radiation to pass therethrough is removed when a picture is taken, in order to make the image visible when it is dark (nighttime), even though the color reproduction is slightly attenuated when it is light (daytime). However, removal of the infrared filter makes it impossible to adjust the quantity of infrared radiation transmission.

SUMMARY OF THE INVENTION

It is an object of the present invention to eliminate the drawbacks of an automatic aperture control apparatus of a lens for a CCTV camera in the prior art by providing an automatic aperture control apparatus in which the quantity of transmission light including infrared radiation can be controlled.

To achieve the object mentioned above, according to an aspect of the present invention, s diaphragm apparatus of a lens for a CCTV camera is provided, including a diaphragm blade which opens and closes a stop aperture of the diaphragm apparatus; and an ND filter which is attached to the diaphragm blade, the ND filter having a spectral transmittance so that the transmittance of infrared radiation therethrough is substantially identical to, or less than, the transmittance of visible light therethrough. The ND filter covers the stop aperture when the diaphragm blade is moved to open the aperture.

The infrared radiation, for example, can correspond to a wavelength band of approximately 700 nm to 1000 nm.

In an embodiment, the ND filter has a surface reflectivity not greater than approximately 2%.

Preferably, the ND filter is made of a resin substrate coated with a metal evaporated thereon.

According to another aspect of the present invention, a diaphragm apparatus of a lens for a CCTV camera is provided, including a diaphragm blade which opens and closes a stop aperture of the diaphragm apparatus; and an ND filter which is attached to the diaphragm blade, the ND filter having a spectral transmittance which cuts out infrared radiation. The ND filter covers the stop aperture when the diaphragm blade is moved to open the aperture.

The infrared radiation, for example, can correspond to a wavelength band of approximately 700 nm to 1000 nm.

In an embodiment, the ND filter has a surface reflectivity not greater than approximately 2%.

Preferably, the ND filter is made of a resin substrate coated with a metal evaporated thereon.

The present disclosure relates to subject matter contained in Japanese Patent Application No.2000-238243 (filed on Aug. 7, 2000) which is expressly incorporated herein by reference in its entirety.

DESCRIPTION OF THE PREFERRED EMBODIMENT

Figure 1:
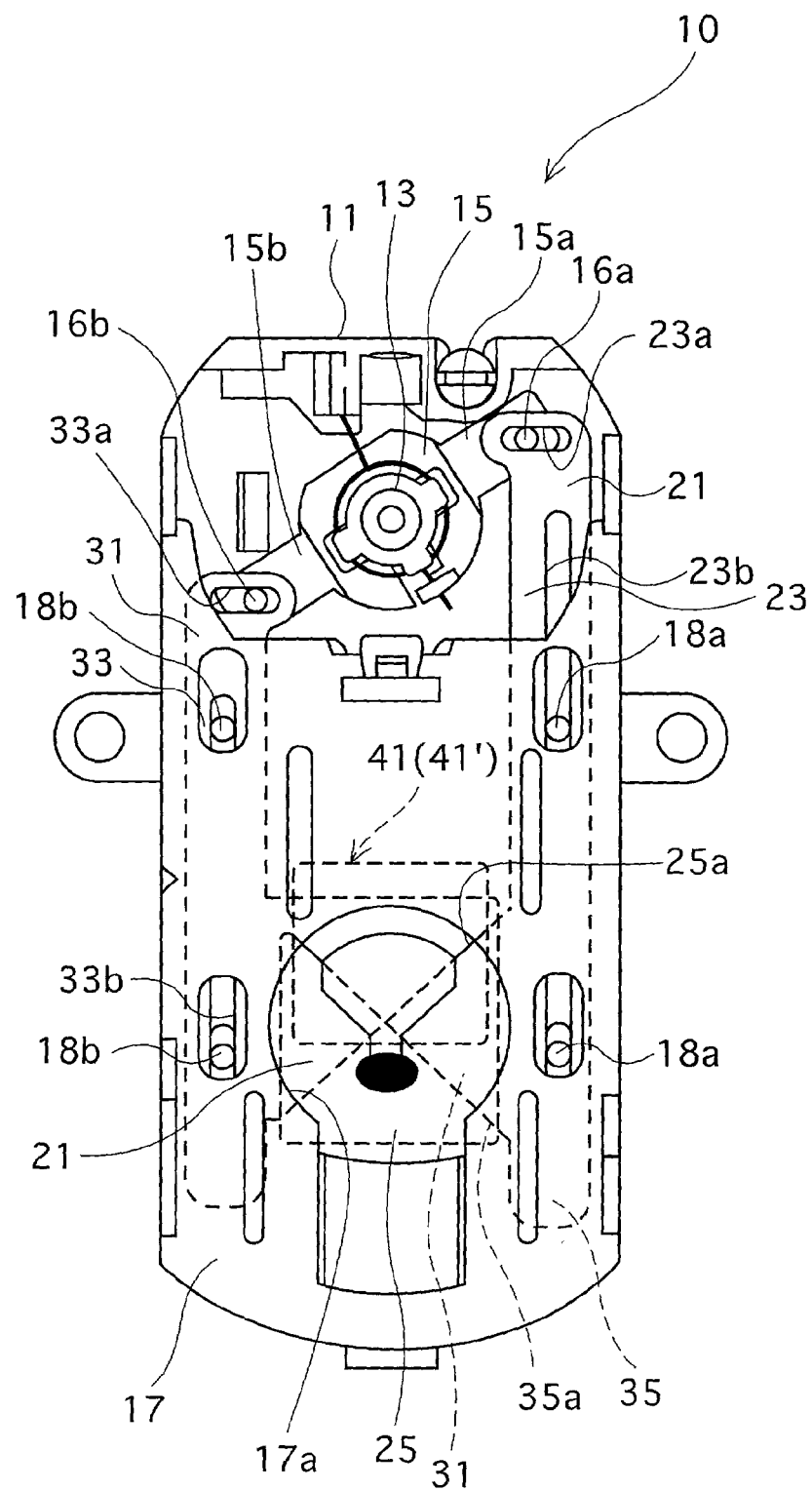
FIG. 1 is a front elevational view of a diaphragm apparatus of a lens for a CCTV camera, according to an embodiment of the present invention.

An embodiment of the invention will be discussed below in detail with reference to the drawings. In FIG. 1 which shows a front elevational view of a main part of a diaphragm apparatus 10 of a lens for a CCTV camera viewed from the object side, the diaphragm apparatus 10 automatically controls the stop aperture 17a by moving two diaphragm blades (first and second diaphragm blades) 21 and 31 in opposite directions, using a galvanometer (servo meter) 13 as a drive source.

The galvanometer 13 is provided with a diaphragm drive lever 15 secured to the rotating shaft thereof. The diaphragm drive lever 15 is provided on one end 15a thereof with a pin 16a which is fitted in an elongated hole 23a of the first diaphragm blade 21. The diaphragm drive lever 15 is provided on the other end 15b thereof with a pin 16b which is fitted in an elongated hole 33a of the second diaphragm blade 31.

Figure 4A:
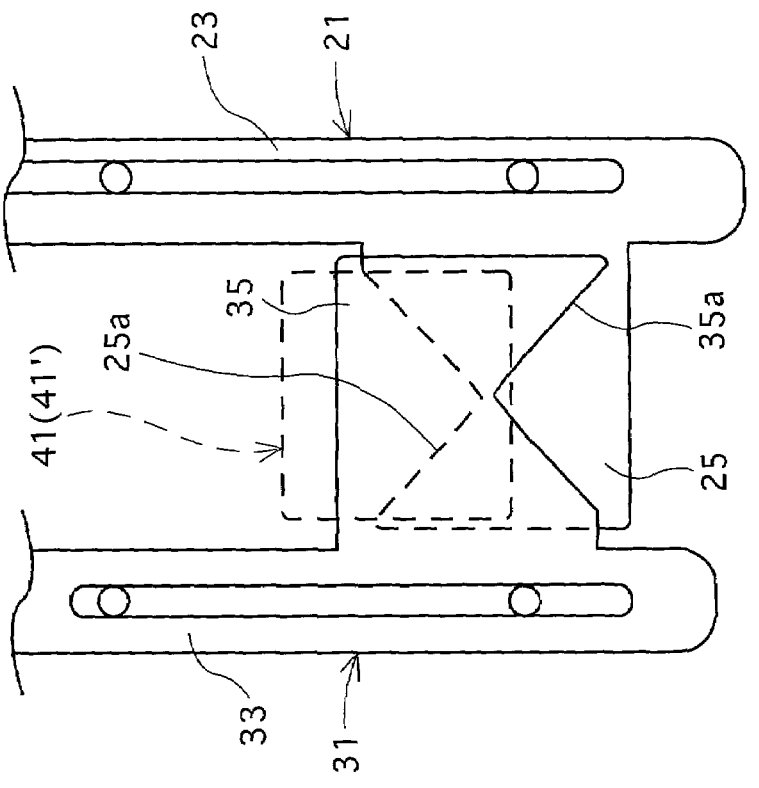
FIGS. 4A and 4B show a simplified view of the open and closed states of the diaphragm of FIG. 1.
Figure 4B:
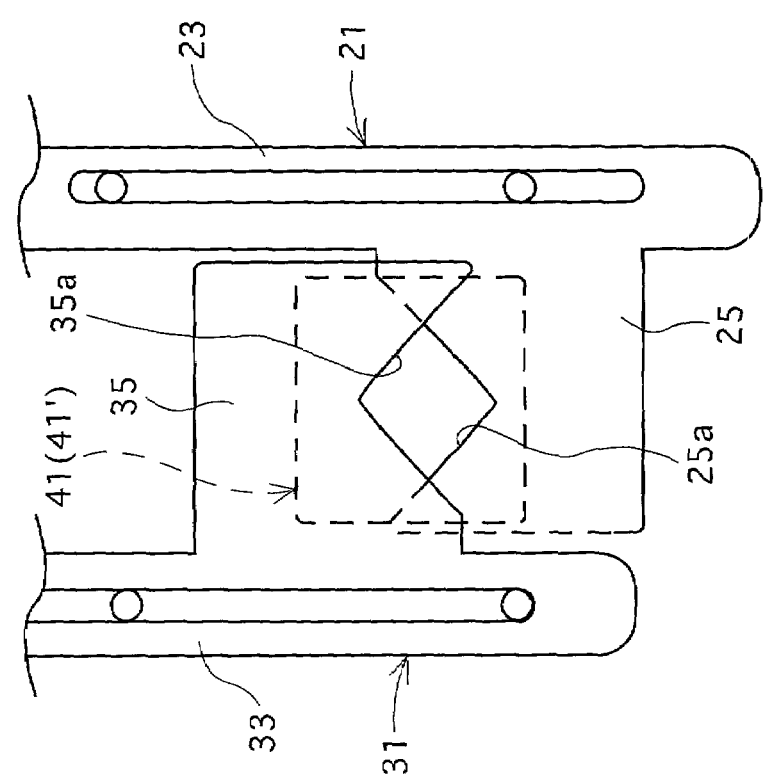

As shown in FIGS. 4A and 4B, the first diaphragm blade 21, which has a general shape of the letter "j", is composed of a guide plate portion 23 which extends along one of the side edges of the diaphragm body 11 and which is provided on its front end with an elongated hole 23a, and a diaphragm portion 25 whose upper end defines a generally V-shaped diaphragm edge portion 25a.

The second diaphragm blade 31, which has a general shape of the letter "h", is composed of a guide plate portion 33 which extends along the other side edge of the diaphragm body 11 and which is provided on its front end with an elongated hole 33a, and a diaphragm portion 35 whose lower end defines an inverted generally V-shaped diaphragm edge portion 35a.

The stop aperture 17a is restricted by the diaphragm edge portions 25a and 35a of the first and second diaphragm blades 21 and 31.

The first and second diaphragm blades 21 and 31 are provided with elongated guide holes 23b and 33b which extend along the guide plate portions 23 and 33, wherein guide pins 18a and 18b provided on the diaphragm body 11 are slidably fitted into the guide plate portions 23 and 33, respectively. Consequently, when the diaphragm lever 15 is rotated, the guide pins 18a and 18b are moved along the elongated guide holes 23b and 33b, respectively. Namely, when the rotation of the diaphragm lever 15 occurs, the first and second diaphragm blades 21 and 31 are linearly guided along the elongated guide holes 23b and 33b in association with each other, so that the size of the stop aperture can be varied by varying the amount of overlap of the diaphragm edge portions 25a and 35a.

In the diaphragm apparatus 10, an ND filter 41 is attached (adhered) to the first diaphragm blade 21. When the diaphragm apparatus 10 is in an open state as shown in FIG. 4A, the ND filter 41 covers the opening defined by the diaphragm edge portion 25a and the diaphragm edge portion 35a of the first and second diaphragm blades 21 and 31, respectively. As an alternative construction, it is possible to adhere an ND filter (not shown) similar to the ND filter 41, to the second diaphragm blade 31. Note that FIG. 4B shows a closed state of the diaphragm apparatus.

Figure 2:
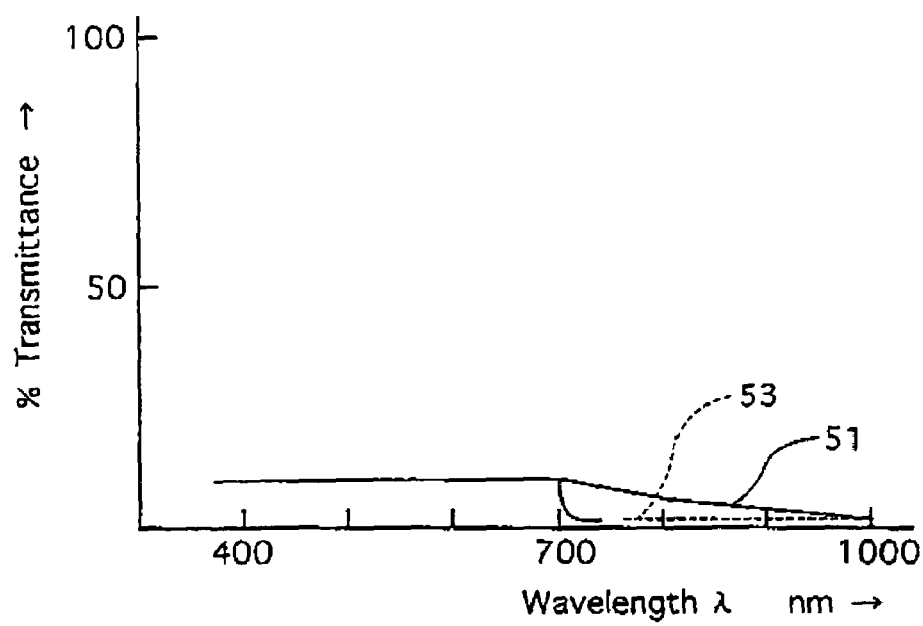
FIG. 2 is a graph showing spectral transmittance characteristics of an ND filter in a diaphragm apparatus shown in FIG. 1.
Figure 3:
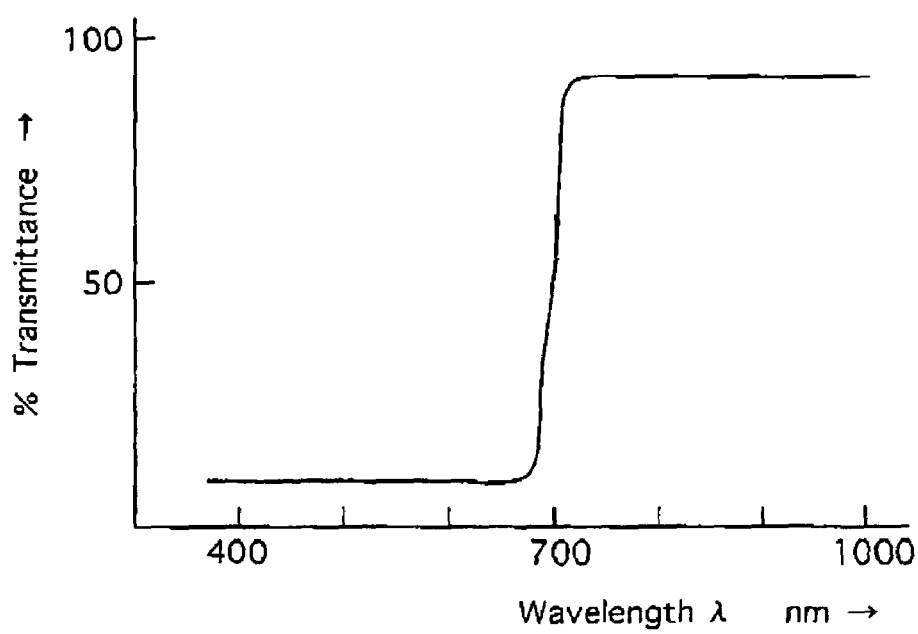
FIG. 3 is a graph showing spectral transmittance characteristics of an ND filter used in a known lens diaphragm apparatus for a CCTV camera.

Spectral transmittance characteristics 51 of the ND filter 41 are shown in FIG. 2. The ND filter 41 is made of a resin substrate coated with a metal which is evaporated thereon. The spectral transmittance characteristic 51 of the ND filter 41 is such that the transmittance of the infrared radiation is substantially identical to or less than the transmittance of visible light. Due to the spectral transmittance characteristics 51 in which the transmittance of the infrared radiation is substantially identical to the transmittance of the visible light, if the diaphragm apparatus 10 is used on a color CCTV camera, it is possible to restrict the amount of light transmitted therethrough without deteriorating the color properties, and if the diaphragm apparatus 10 is used on a monochrome CCTV camera which is sensitive to infrared radiation, it is possible to increase the F-number sufficiently for the wavelength band of infrared radiation in order to restrict the quantity of transmission light.

In an alternative embodiment of the present invention, an ND filter 41' having a spectral transmittance characteristic is used instead of the ND filter 41, in order to cut out infrared radiation. Spectral transmittance characteristics 53, which correspond to the ND filter 41', are also indicated in FIG. 2. If the diaphragm apparatus 10 having the ND filter 41' (having the spectral transmittance characteristics 53) is used on a monochrome CCTV camera, which is sensitive to infrared radiation, an infrared photography phenomenon wherein intensively bright portions of the object whose reflectivity of the infrared radiation is high does not occur.

The infrared region in the embodiments of the invention refers to a wavelength not less than approximately 700 nm, and is preferably in the range of 700 nm to 1000 nm; however the wavelength of the infrared radiation is not specifically limited thereto, and can be smaller or larger than 700 nm.

A further feature of the present invention resides in the surface reflectivity of the ND filter 41 not being greater than approximately 2%. Due to such a low reflectivity, little surface reflection of the ND filter 41 takes place and, thus, neither ghost images nor flare due to light reflected by the surface of the ND filter 41 occur.

As can be understood from the above discussion, in the diaphragm apparatus of a lens for a CCTV camera according to the present invention, an ND filter whose spectral transmittance characteristics are such that the transmittance of infrared radiation is substantially identical to, or less than, the transmittance of visible light, or an ND filter having a very low spectral transmittance is attached to the diaphragm blade. Consequently, in a color CCTV camera, it is possible to restrict the quantity of the light transmitted therethrough without deteriorating the chromatic properties thereof, and in a CCTV camera having no infrared filter, it is possible to restrict the quantity of light transmitted therethrough over the whole wavelength bands.

Moreover, if an ND filter is used which is made of a resin substrate coated with a metal evaporated thereon, having a surface reflectivity not greater than approximately 2%, little reflection at the surface of the ND filter occurs, thus neither ghost images nor flare results.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A diaphragm apparatus of a lens for a CCTV camera comprising:
   a diaphragm blade which opens and closes a stop aperture of said diaphragm apparatus; and
   an ND filter which is attached to said diaphragm blade, said ND filter having a spectral transmittance such that the transmittance of infrared radiation through said ND filter at the infrared spectrum is equal to or less than the transmittance of visible light through said ND filter at any range of the visible light spectrum by an amount such that the transmittance of the visible light is the same over the entirety of the visible light spectrum and the transmittance of the infrared light is the same over substantially the entirety of the infrared light spectrum;
   wherein said ND filter covers said stop aperture when said diaphragm blade is moved to open said aperture.

2. The diaphragm apparatus of a lens for a CCTV camera according to claim 1, wherein said infrared spectrum corresponds to a wavelength band of approximately 700 nm to 1000 nm.

3. The diaphragm apparatus of a lens for a CCTV camera according to claim 1, wherein the ND filter has a surface reflectivity not greater than approximately 2%.

4. The diaphragm apparatus of a lens for a CCTV camera according to claim 1, wherein the ND filter comprises a resin substrate coated with a vapor-deposited metal.

5. A diaphragm apparatus of a lens for a CCTV camera comprising:
   a diaphragm blade which opens and closes a stop aperture of said diaphragm apparatus; and
   an ND filter which is attached to said diaphragm blade, said ND filter having a spectral transmittance which cuts out infrared radiation such that the transmittance of infrared radiation through said ND filter at the infrared spectrum is less than the transmittance of visible light through said ND filter at any range of the visible light spectrum by an amount such that the transmittance of the visible light is the same over the entirety of the visible light spectrum and the transmittance of the infrared light is the same over substantially the entirety of the infrared spectrum;

wherein said ND filter covers said stop aperture when said diaphragm blade is moved to open said aperture.

6. The diaphragm apparatus of a lens for a CCTV camera according to claim 5, wherein said infrared spectrum corresponds to a wavelength band of approximately 700 nm to 1000 nm.

7. The diaphragm apparatus of a lens for a CCTV camera according to claim 5, wherein the ND filter has a surface reflectivity not greater than approximately 2%.

8. The diaphragm apparatus of a lens for a CCTV camera according to claim 5, wherein the ND filter comprises a resin substrate coated with a vapor-deposited metal.

9. A diaphragm apparatus of a lens for a CCTV camera comprising:
   a diaphragm blade which opens and closes a stop aperture of said diaphragm apparatus; and
   an ND filter which is attached to said diaphragm blade, said ND filter having a spectral transmittance such that the transmittance of infrared radiation through said ND filter at the infrared spectrum is equal to or less than the transmittance of visible light through said ND filter at any range of the visible light spectrum by an amount such that the transmittance of the visible light is substantially the same over substantially the entirety of the visible light spectrum and the transmittance of the infrared light is the same over substantially the entirety of the infrared spectrum;

wherein said ND filter covers said stop aperture when said diaphragm blade is moved to open said aperture.

* * * * *